Patented Aug. 15, 1939

2,169,984

UNITED STATES PATENT OFFICE 2,169,984

PERFUME

Albert Weissenborn, Dessau-in-Anhalt, Germany, assignor to Winthrop Chemical Company, Inc., New York, N. Y., a corporation of New York No Drawing. Application June 1, 1938, Serial No. 211,204. In Germany June 15, 1937

4 Claims. (Cl. 167—94)

In Recueil des Travaux Chimiques des Pays-Bas, 1935, pages 995 et seq., ketals are described which are produced by condensing pyrocatechol with aliphatic ketones. Ketals have not hitherto been used for making perfumes; thus on page 998 of the above application the condensation product from acetone and pyrocatechol is stated to have a peculiar odor, but, owing to the resemblance of the latter to that of aromatic hydrocarbons and also on account of the comparatively low boiling point of the ketal, the product is not suitable for use in perfumery.

This invention relates to the application in perfumery of ketals of the aforesaid kind which contain in the ketone residue at least 6 carbon atoms but at most 9 carbon atoms, for these bodies possess perfumes which differ widely from those of the ketals of lower molecular weight and, therefore, are very useful in compounding new perfumery mixture. Ketals having more than 9 carbon atoms in the ketone residue are useless, since they are substantially without odor. The ketals in question are derived, therefore, from pyrocatechol and dipropyl ketone or diisopropyl ketone or the corresponding butyl ketones (symmetrical ketones) or even unsymmetrical ketones, for instance methyl-butyl ketone or methyl-amyl ketone. The character of the odor of ketals from symmetrical ketones resembles that of natural geranium oil or of the rose. Especially suitable is the diisopropyl pyrocatechol ketal of the formula

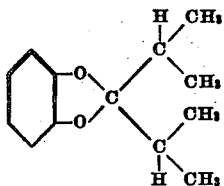

which is useful for producing perfumery mixtures of the type of geranium oil. In pure condition it resembles water in appearance and boils at 95 to 97° C. under a pressure of 5 to 6 mms. On the other hand, the aforesaid unsymmetrical ketones having a longer side chain are suitable for compounding jasmin mixtures; especially useful in this case is methyl-amyl pyrocatechol ketal which has the 5-carbon atom side chain characteristic of jasmone and amyl cinnamic aldehyde which are the best jasmin compounds. This compound corresponds with the formula

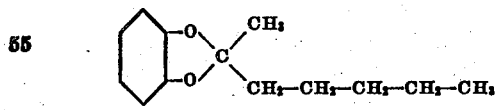

and when pure resembles water in appearance and boils at 100 to 102° C. under 5 mms. pressure.

The following examples illustrate the invention:

EXAMPLE 1

Artificial geranium oil

| | Per cent |
|---|---|
| Diisopropylpyrocatechol ketal | 25 |
| Phenylethyl alcohol | 15 |
| Geraniol | 41 |
| Diphenyl ether | 4 |
| Citronellol R | 15 |
| | 100 |

EXAMPLE 2

Rose

| | Per cent |
|---|---|
| Citronellol R | 22 |
| Geraniol | 25 |
| Phenyl ethyl alcohol | 30 |
| Nerol | 5 |
| Methylionone | 4 |
| Phenylacetic acid (10% strength) | 4 |
| Phenylacetaldehyde (10% strength) | 2 |
| Diisopropylpyrocatechol ketal | 6 |
| Nonyl aldehyde (10% strength) | 2 |
| | 100 |

EXAMPLE 3

Jasmin

| | Per cent |
|---|---|
| Methylamylpyrocatechol ketal | 6 |
| α-amylcinnamic aldehyde | 20 |
| Benzyl acetate | 30 |
| Linalool | 10 |
| Benzyl salicylate | 10 |
| Cinnamic alcohol | 3 |
| Hydroxycitronellal | 6 |
| Linalyl acetate | 3 |
| Indol (10% strength) | 5 |
| Phenylethyl alcohol | 2 |
| β-acetonaphthone | 5 |
| | 100 |

EXAMPLE 4

Jasmin

| | Per cent |
|---|---|
| Methylamylpyrocatechol ketal | 5 |
| α-amylcinnamic aldehyde | 10 |
| Benzylsalicylate | 10 |
| Hydroxycitronellal | 10 |
| Phenylethyl alcohol | 10 |
| Benzylbutyrate | 2.5 |
| Linalyl acetate | 5 |
| Terpineol | 7.5 |
| Benzyl acetate | 40 |
| | 100 |

EXAMPLE 5

*Honey*

| | Per cent |
|---|---|
| Diisobutylpyrocatechol ketal | 75 |
| Methylionone | 6 |
| Phenylacetic acid (10% strength) | 3 |
| Genuine rose oil (1% strength) | 15 |
| Acetophenone | 1 |
| | 100 |

What I claim is:

1. Perfumes containing as a constituent a ketal of pyrocatechol of the general formula

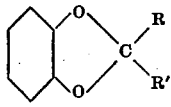

wherein R and R' mean aliphatic radicals and wherein the ketonic radical

contains at least 6 but not more than 9 carbon atoms.

2. Perfumes containing as a constituent methylamylpyrocatechol ketal of the formula

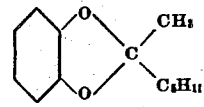

3. Perfumes containing as a constituent diisopropylpyrocatechol ketal of the formula

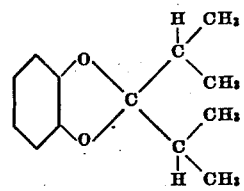

4. Perfumes containing as a constituent a butylpyrocatechol ketal of the formula

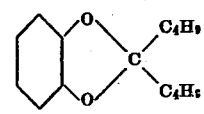

ALBERT WEISSENBORN.